US012374841B2

(12) United States Patent
Chin

(10) Patent No.: US 12,374,841 B2
(45) Date of Patent: Jul. 29, 2025

(54) SOCKET AND PLUG CABLE CONNECTOR ASSEMBLY

(71) Applicant: ENERGY FULL ELECTRONICS CO., LTD., New Taipei (TW)

(72) Inventor: Hsu-Shen Chin, New Taipei (TW)

(73) Assignee: Energy Full Electronics Co., Ltd, New Taipel (TW)

( * ) Notice: Subject to any disclaimer, the term of this patent is extended or adjusted under 35 U.S.C. 154(b) by 377 days.

(21) Appl. No.: 17/822,786

(22) Filed: Aug. 28, 2022

(65) Prior Publication Data

US 2024/0030666 A1 Jan. 25, 2024

(30) Foreign Application Priority Data

Jul. 25, 2022 (TW) ................................ 111207992

(51) Int. Cl.
*H01R 13/502* (2006.01)
*H01R 24/60* (2011.01)

(52) U.S. Cl.
CPC ........... *H01R 24/60* (2013.01); *H01R 13/502* (2013.01)

(58) Field of Classification Search
CPC ........................................ H01R 24/60–13/502
See application file for complete search history.

(56) References Cited

U.S. PATENT DOCUMENTS 11,108,190 B2 8/2021 Zhu
2013/0203277 A1 8/2013 Gaubert
2015/0099385 A1* 4/2015 Ikeya ................. H01R 12/7005 439/271
2020/0274287 A1* 8/2020 Zhu .................... H01R 13/6582
2022/0095038 A1 3/2022 Xie et al.
2023/0032231 A1 2/2023 Bunke

FOREIGN PATENT DOCUMENTS

CN 209329277 8/2019
CN 210957117 7/2020
CN 113451835 9/2021
WO WO 2021/162672 8/2021

OTHER PUBLICATIONS

European Search Report and the European Search Opinion Dated Dec. 5, 2023 From the European Patent Office Re. Application No. 23165975.6. (17 Pages).

* cited by examiner

*Primary Examiner* — Vanessa Girardi

(57) ABSTRACT

Embodiments of the present disclosure are directed to an electrical connector assembly. The electrical connector assembly includes a socket connector cable assembly and a plug connector cable assembly. The socket connector cable assembly includes a receptacle external mold, a socket connector, and a cable. The plug connector cable assembly comprises a plug external mold, a plug connector, a pad, and a plug cable. When the socket connector cable assembly is connected to the plug connector cable assembly, the circuit board of the socket connector cable assembly is connected to the plug circuit board of the plug connector cable assembly.

9 Claims, 6 Drawing Sheets

SOCKET AND PLUG CABLE CONNECTOR ASSEMBLY

CROSS REFERENCE TO RELATED APPLICATION

This application claims priority to Taiwanese Application No. 111207992, filed on Jul. 25, 2022. The entire disclosure of the above application is incorporated herein by reference.

FIELD OF THE INVENTION

The present disclosure relates to an electrical connector assembly, more particularly, to a socket connector cable assembly and a plug connector cable assembly with a waterproof functional structure between connection interfaces.

BACKGROUND

The interface of the universal serial bus (USB) type-C electrical connector is a hardware interface of the USB. Because its upper and lower ends are completely consistent, it is widely used by the public.

However, there is no waterproof design between the socket connector and the plug connector of the general USB type-C connector assembly, which may cause a short circuit of the mated connector assembly due to water penetration when it is outdoors or in other use environments where there is a chance to be exposed to water. The equipment using the short circuit of the mated connector assembly may be damaged, or even a fire may occur to harm the user. Therefore, how to overcome the problem of conventional structure is an important issue to be solved.

In view of this, it is necessary to provide an electrical connector assembly to solve the problems of the prior art.

SUMMARY

According to one embodiment of the present disclosure, an electrical connector assembly comprises a socket connector cable assembly and a plug connector cable assembly. The socket connector cable assembly comprises a receptacle external mold, a socket connector, and a cable. The receptacle external mold has a guiding portion and an engaged portion, and the guiding portion is disposed adjacent to the engaged portion. The socket connector is covered by the receptacle external mold and provided with a circuit board. The cable is connected to the circuit board. The plug connector cable assembly comprises a plug external mold, a plug connector, a pad, and a plug cable. The plug connector is provided with a plug circuit board protruding and assembled with the plug external mold. The pad is disposed at a front edge or a side edge of the plug connector cable assembly. The plug cable is connected to the plug circuit board. When the socket connector cable assembly is connected to the plug connector cable assembly, the circuit board of the socket connector cable assembly is connected to the plug circuit board of the plug connector cable assembly.

Optionally, a width of the engaged portion is less than a width of the guiding portion.

Optionally, a length of the guiding portion is greater than a docking depth of the socket connector cable assembly.

Optionally, a front edge of the socket connector cable assembly is provided with a compressing surface.

Optionally, the socket connector cable assembly further comprises a receptacle internal mold disposed in the receptacle external mold.

According to one embodiment of the present disclosure, an electrical connector assembly comprises a socket connector cable assembly and a plug connector cable assembly. The socket connector cable assembly comprises a receptacle external mold, a receptacle front housing, a socket connector, and a cable. The receptacle front housing has a guiding portion and an engaged portion, and the guiding portion is disposed adjacent to the engaged portion and has a buckling portion. The socket connector is provided with a circuit board. The cable is connected to the circuit board. The plug connector cable assembly comprises a plug external mold, a plug connector, a pad, and a plug cable. The plug connector is provided with a plug circuit board protruding and assembled with the plug external mold. The pad is disposed at a front edge or a side edge of the plug connector cable assembly. The plug cable is connected to the plug circuit board. When the socket connector cable assembly is connected to the plug connector, the circuit board of the socket connector cable assembly is connected to the plug circuit board of the plug connector cable assembly.

Optionally, a width of the engaged portion is less than a width of the guiding portion.

Optionally, a length of the guiding portion is greater than a docking depth of the socket connector cable assembly.

Optionally, a front edge of the socket connector cable assembly is provided with a compressing surface.

Optionally, the socket connector cable assembly further comprises a receptacle internal mold disposed in the receptacle external mold having a fixed portion that is assembled with the buckling portion of the receptacle front housing.

To sum up, in the electrical connector assembly and its base of the present disclosure, the structure design of the contact interface does not have a specific direction during assembly, so that non-directional docking can be realized, which can be easily assembled without limiting the circuit layout. Furthermore, it is possible to save the material which is increased due to the provision of the fool-proofing structure, thereby achieving the purpose of reducing the production cost.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show merely some embodiments of this application, and a person of ordinary skill in the art may still derive other drawings from these accompanying drawings without creative efforts.

DESCRIPTION OF THE EMBODIMENTS

In order to facilitate understanding the technical features, content and advantages of the invention and the efficacy it can achieve, the present disclosure is hereby combined with the accompanying drawings, and the expression of the embodiment is described in detail as follows, and the scheme used therein, the main purpose of which is only for illustrative and auxiliary explanation purposes, may not be the true proportion and precise configuration of the embodiment of the present disclosure, so the proportion and configuration relationship of the attached drawing should not be interpreted, limiting the scope of rights of the invention in the actual implementation.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

The following will refer to the relevant drawings, illustrating various embodiments of the present disclosure, for ease of understanding, the same components in the following embodiments are illustrated by the same symbols.

Figure 1:
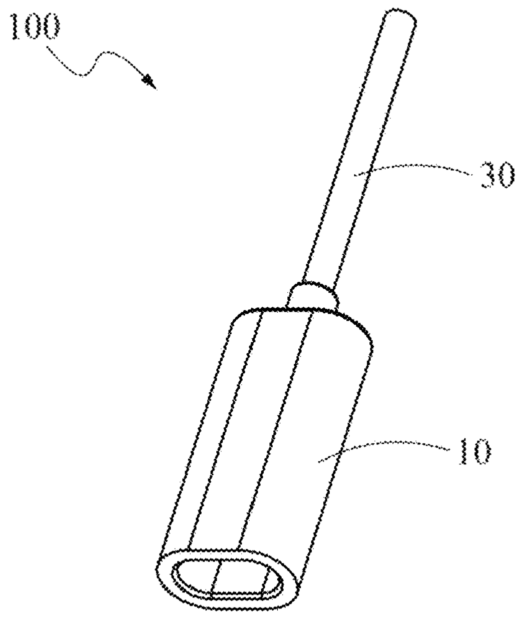
FIG. 1 is a perspective view of a socket connector cable assembly according to a first embodiment of the present disclosure.
Figure 2:
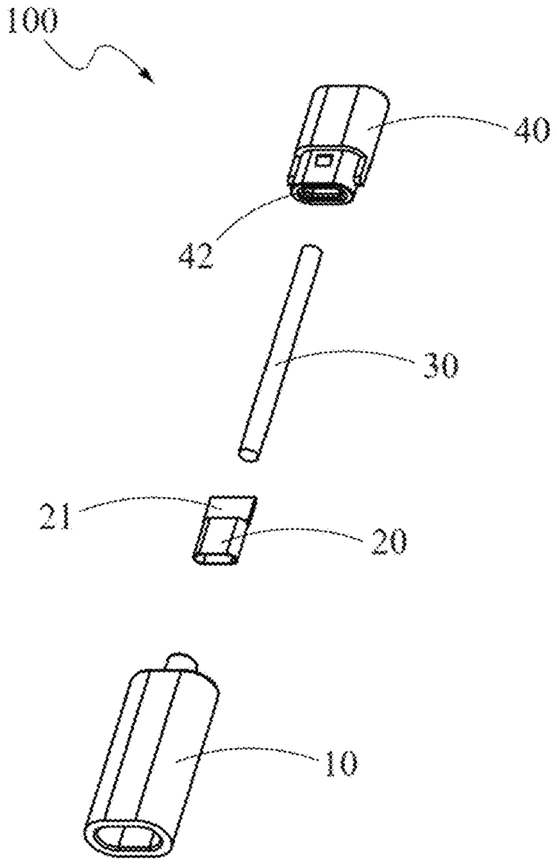
FIG. 2 is an exploded view of the socket connector cable assembly according to the first embodiment of the present disclosure.

Please refer to FIGS. 1 and 2. FIG. 1 is a perspective view of a socket connector cable assembly according to a first embodiment of the present disclosure. FIG. 2 is an exploded view of the socket connector cable assembly according to the first embodiment of the present disclosure. In this embodiment, the socket connector cable assembly 100 comprises a receptacle external mold 10, a socket connector 20, and a cable 30. The socket connector 20 is covered by the receptacle external mold 10 and provided with a circuit board 21. The cable 30 is connected to the circuit board 21.

The material and specifications of the cable 30, the way of the circuit board 21 assembled in the socket connector 20, the actual configuration on the circuit board 21, and the connection between the cable 30 and the circuit board 21 or the entire socket connector cable assembly 100, on the premise of not affecting the function of the contact interface, appropriate adjustments can be made according to the actual situation, and it is not limited thereto.

The socket connector cable assembly 100 further comprises a receptacle internal mold 40 disposed in the receptacle outer mold 10. Specifically, the structure of the receptacle external mold 10 determines the docking manner of the socket connector cable assembly 100. The receptacle internal mold 40 and the socket connector 20 are both covered by the receptacle external mold 10 at the same time.

Figure 3:
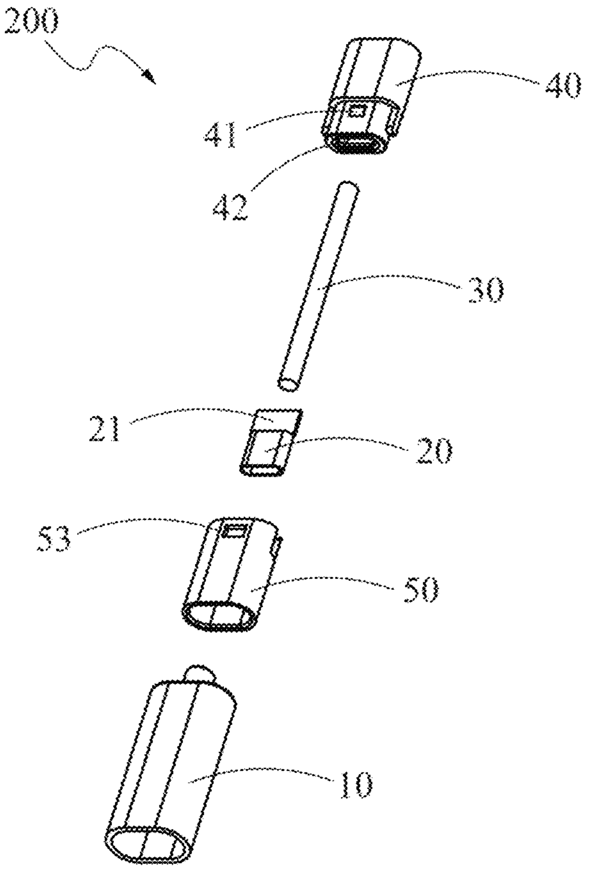
FIG. 3 is an exploded view of the socket connector cable assembly according to a second embodiment of the present disclosure.

Please refer to FIG. 3. FIG. 3 is an exploded view of the socket connector cable assembly according to a second embodiment of the present disclosure. The socket connector cable assembly 200 comprises a receptacle external mold 10, a receptacle front housing 50, a socket connector 20, and a cable 30. The receptacle front housing 50 has a buckling portion 53. The socket connector 20 is capable of being assembled with the receptacle front housing 50, and the circuit board 21 is disposed therein. The cable 30 is connected to the circuit board 21.

The difference between the socket connector cable assembly 200 and the socket connector cable assembly 100 of the previous embodiment lies in the arrangement of the receptacle front housing 50, since the receptacle front housing 50 and the socket connector 20 are both disposed in the socket connector cable assembly 200. The receptacle internal mold 40 has a fixed portion 41 for docking with the buckling portion 53 of the receptacle front housing 50. The fixed portion 41 is protruded from the receptacle internal mold 40, and the buckling portion 53 is recessed on the receptacle front housing 50. The numbers of the fixed portions 41 and the buckling portion 53 are not limited to the positions of the receptacle internal mold 40 and the receptacle front housing 50.

With the arrangement of the receptacle front housing 50, the socket connector 20 and the circuit board 21 provided therein can be more protected, so as to extend the service life of the socket connector cable assembly 200. It also makes it easier for users to replace parts in terms of maintenance, and the material between the receptacle front housing 50 and the receptacle internal mold 40 can also be adjusted in design to maximize benefits. In other embodiments, the receptacle internal mold 40 may also be integrally formed with the receptacle external mold 10.

Figure 4:
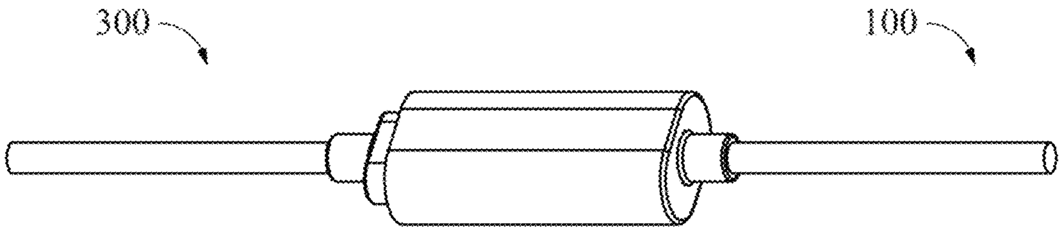
FIG. 4 is a perspective view of an electrical connector assembly according to the first embodiment of the present disclosure.
Figure 5:
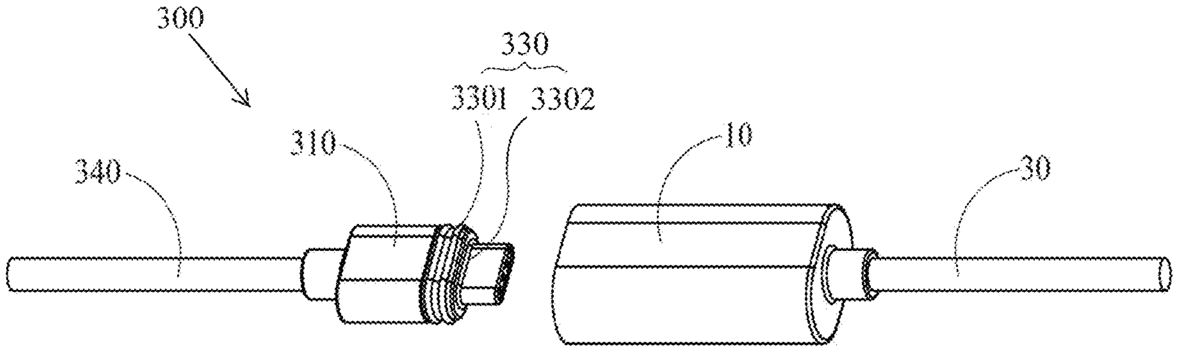
FIG. 5 illustrates an unmated socket connector cable assembly and a plug connector cable assembly according to one embodiment of the present disclosure.
Figure 6:
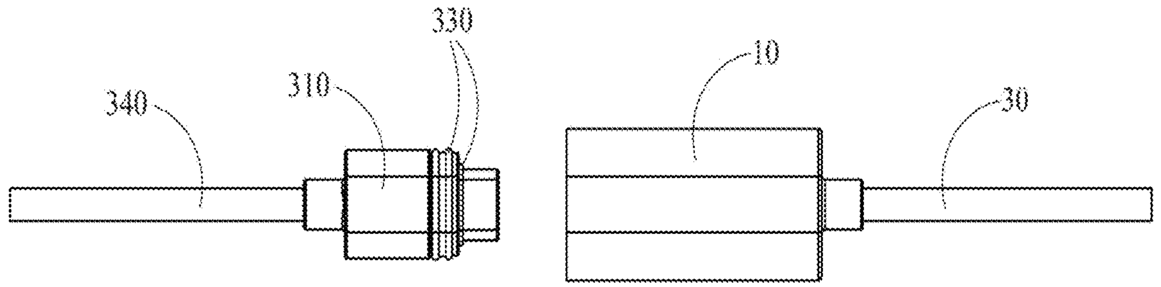
FIG. 6 is a top view of the unmated socket connector cable assembly and the plug connector cable assembly of FIG. 5.
Figure 7:
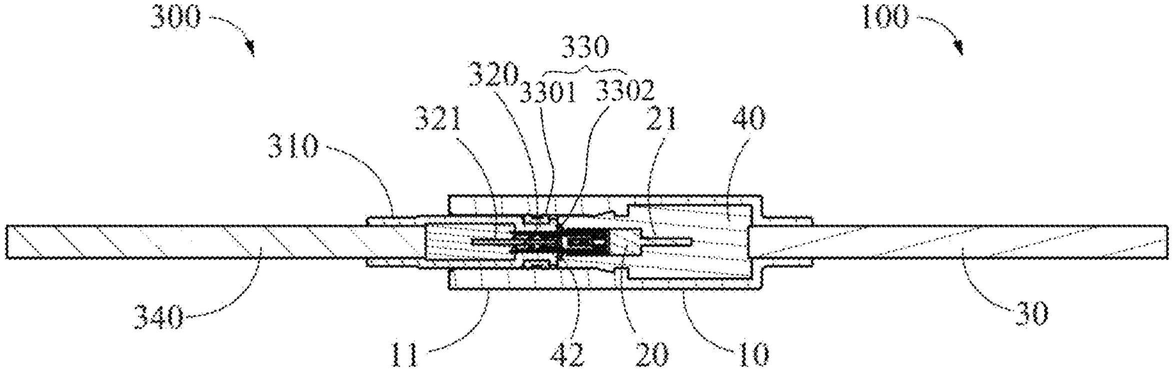
FIG. 7 is a cross-sectional view (1) of the electrical connector assembly according to the first embodiment of the present disclosure.
Figure 8:
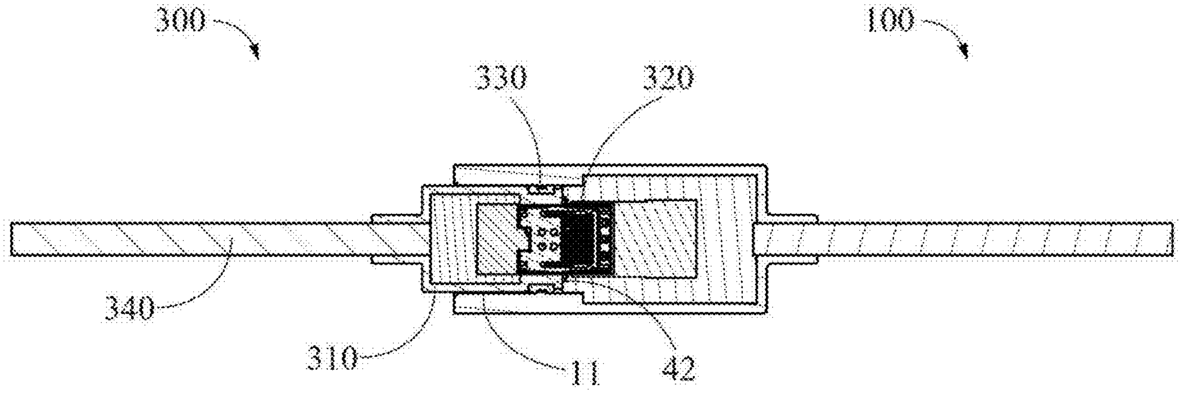
FIG. 8 is a cross-sectional view (2) of the electrical connector assembly according to the first embodiment of the present disclosure.

Please refer to FIGS. 4 to 8, which are a perspective view and a cross-sectional view of an electrical connector assembly according to the first embodiment of the present disclosure. FIGS. 5 and 6 illustrate an unmated electrical connector assembly according to one embodiment of the present disclosure. FIGS. 7 and 8 are illustrate a mated electrical connector assembly according to one embodiment of the present disclosure. As shown in FIG. 4, the electrical connector assembly comprises a socket connector cable assembly 100 and a plug connector cable assembly 300. Both the socket connector cable assembly 100 and the plug connector cable assembly 300 conform to the interface of the USB Type-C electrical connector. As shown in FIGS. 7 and 8, the plug connector cable assembly 300 comprises a plug external mold 310, a plug connector 320, a pad 330, and a plug cable 340. As shown in FIGS. 7 and 8, the plug cable 340 is connected to a plug circuit board 321. The plug connector 320 is provided with the plug circuit board 321 protruding. The pad 330 is disposed at a front edge or a side edge of the plug connector cable assembly 300, and is used as a spacer to protect a socket connector from excessive damage caused by multiple plug connections, disperse the pressure of the plug connector cable assembly 300 on the socket connector, and reduce the detachment caused by external forces when it is docked with other socket connectors.

As shown in FIGS. 5 and 6, the pad 330 includes a first part 3301 and a second part 3302, which are disposed at both the front edge and the side edge of the plug connector cable assembly 300, but not limited thereto. Specifically, the first part 3301 is disposed on the side edge of the plug connector cable assembly 300, and the second part 3302 is disposed on the front edge of the plug connector cable assembly 300. In some embodiments, the pad 330 may only be disposed on the front edge or the side edge, or the pad 330 on the front edge and the pad 330 on the side are integrally formed, and the material and quantity of the pad 330 are not limited therein.

Please continue to refer to FIGS. 7 and 8, the receptacle external mold 10 has a guiding portion 11. When the socket connector cable assembly 300 is docked with the plug connector cable assembly 100, the plug connector cable assembly 300 follows the guiding portion 11 to guide the insertion direction of the socket connector cable assembly 100, so that the circuit board 21 in the socket connector cable assembly 100 is electrically connected to the plug circuit board 321 protruding from the plug connector cable assembly 300.

A front edge of the socket connector cable assembly 100 is provided with a compressing surface 42. In this embodiment, the compressing surface 42 is integrally formed with the receptacle internal mold 40, but it is not limited thereto. In some embodiments, the setting of the compressing surface 42 may be based on the internal design of the socket connector cable assembly 100, and is not integrally formed with the receptacle internal mold 40. It is only necessary to effectively electrically connect with the circuit board while docking with other electrical connectors, the circuit board 21 in the socket connector cable assembly 200 is electrically connected to the plug circuit board 321 protruding from the plug connector cable assembly 300.

In more detail, with the arrangement of the pad 330 and the compressing surface 42, when the socket connector cable assembly 100 is docked with the plug connector cable assembly 300, the pad 330 is abutted on the compressing surface 42, so that a completely sealed state is formed therebetween, which can effectively prevent the immersion of water or other liquids.

Figure 9:
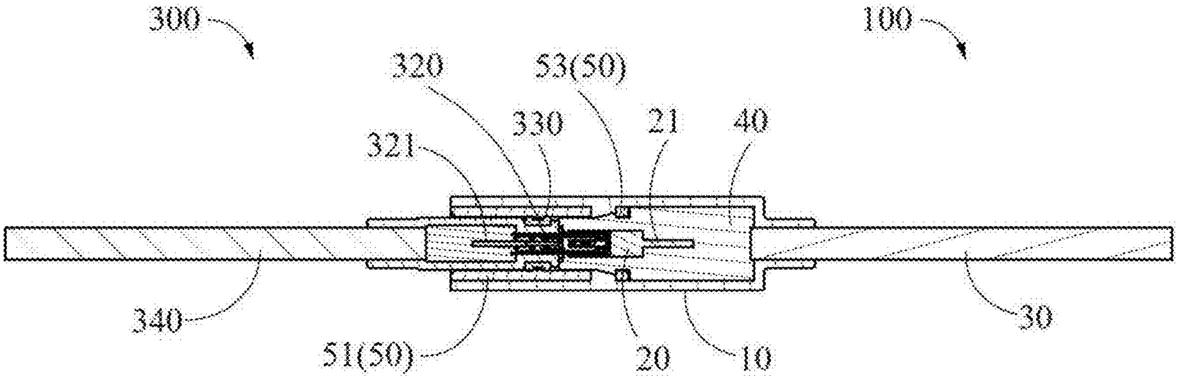
FIG. 9 is a cross-sectional view (1) of the electrical connector assembly according to the second embodiment of the present disclosure.
Figure 10:
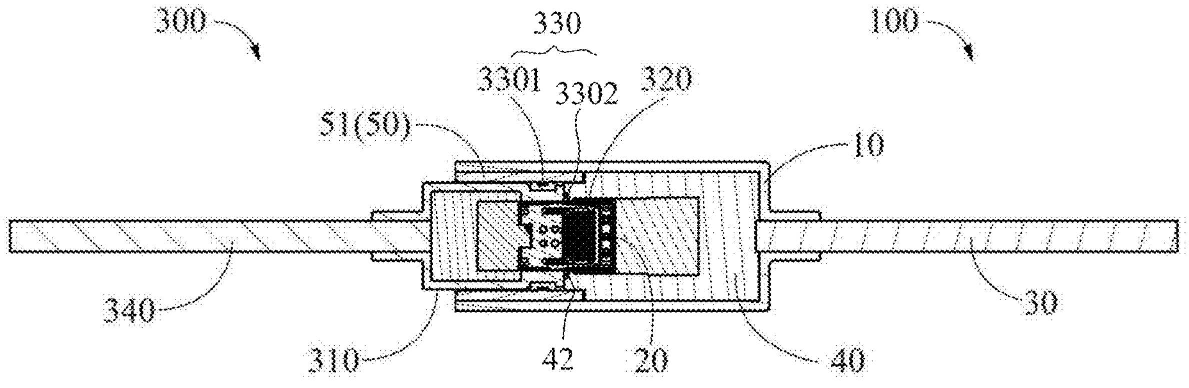
FIG. 10 is a cross-sectional view (2) of the electrical connector assembly according to the second embodiment of the present disclosure.

Please refer to FIGS. 9 and 10, which are respectively a perspective view and a cross-sectional view of the electrical connector assembly according to a second embodiment of the present disclosure. FIGS. 9 and 10 are the electrical connector assembly in a mating state. As shown in FIGS. 9 and 10, the electrical connector assembly comprises a socket connector cable assembly 200 and a plug connector cable assembly 300. Since the difference from the previous embodiment is only in the arrangement of the receptacle front housing 50 in the socket connector cable assembly 200, the features are as described above and will not be repeated here.

The front edge of the socket connector cable assembly 200 is provided with a compressing surface 42. In this embodiment, the compressing surface 42 is integrally formed with the receptacle internal mold 40, but it is not limited thereto. In some embodiments, the setting of the compressing surface 42 can be based on the internal design of the socket connector cable assembly 200, and is not integrally formed with the receptacle internal mold 40. It is only necessary to effectively electrically connect with the circuit board while docking with other electrical connectors, the circuit board 21 in the socket connector cable assembly 200 is electrically connected to the plug circuit board 321 protruding from the plug connector cable assembly 300.

In more detail, with the arrangement of the pad 330 and the compressing surface 42, when the socket connector cable assembly 200 is docked with the plug connector cable assembly 300, the pad 330 is abutted on the compressing surface 42, so that a completely sealed state is formed therebetween, which can effectively prevent the immersion of water or other liquids.

Figure 11:
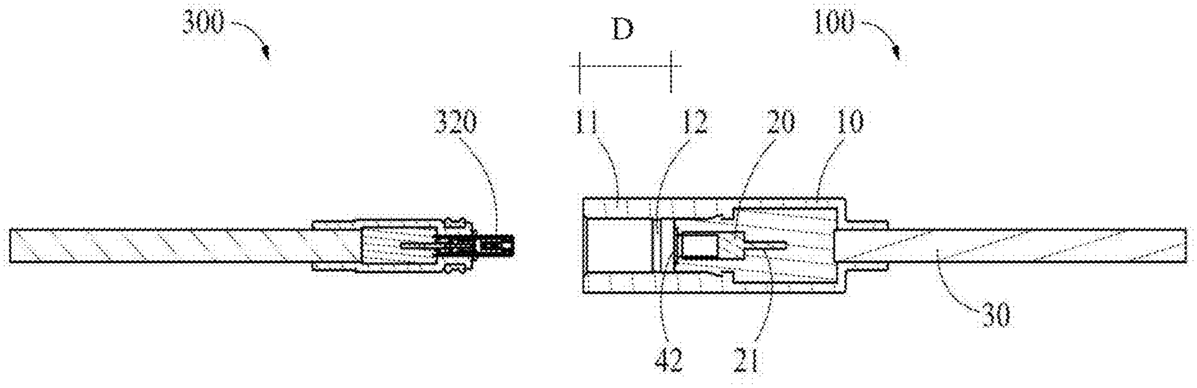
FIG. 11 is a cross-sectional view (3) of the electrical connector assembly according to the first embodiment of the present disclosure.
Figure 12:
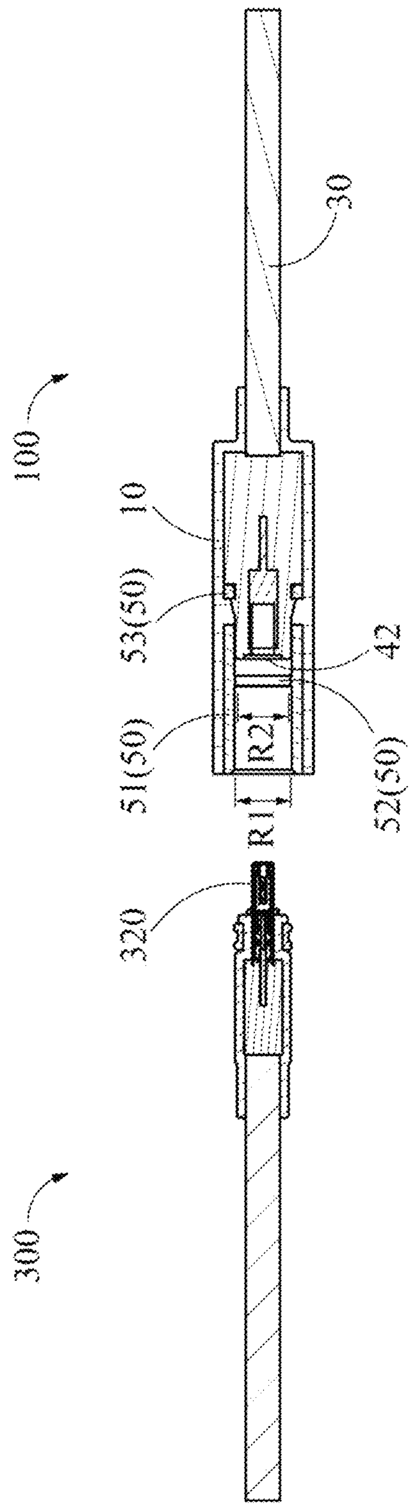
FIG. 12 is a cross-sectional view (3) of the electrical connector assembly according to the second embodiment of the present disclosure.

Please refer to FIGS. 11 and 12. FIGS. 11 and 12 are respectively cross-sectional views of the electrical connector assembly according to the first embodiment and the second embodiment. FIGS. 11 and 12 are the electrical connector assembly in a non-mating state, and the features of the plug connector cable assembly 300 are as described above, which will not be repeated here, and the reference numerals in the figures are also omitted. As shown in FIG. 11, the receptacle external mold 10 has an engaged portion 12, and the guiding portion 11 is disposed adjacent to the engaged portion 12. In this embodiment, the size of the engaged portion 12 is smaller than the size of the guiding portion 11, and the length of the guiding portion 11 is greater than the docking depth of the socket connector cable assembly 100. Therefore, it can be further effectively fixed when docked with other electrical connectors. In addition, the setting of the internal compressing surface 42 completes the waterproof design of the socket connector cable assembly 100.

Please refer to FIG. 12, the receptacle front housing 50 has a guiding portion 51 and an engaged portion 52, and the guiding portion 51 is disposed adjacent to the engaged portion 52. Similarly, the width R2 of the engaged portion 52 is smaller than the width R1 of the guiding portion 51, and the length of the guiding portion 51 is greater than the docking depth of the socket connector cable assembly 200. It can be further effectively fixed when docked with other electrical connectors. In addition, the setting of the internal compressing surface 42 completes the waterproof design of the socket connector cable assembly 200.

Compared with the prior art, in the electrical connector assembly of the present disclosure provided in this embodiment, when the socket connector cable assembly and the plug connector cable assembly are mated, the pad makes the sealing effect between the contact interfaces excellent, so that water or other liquids will not penetrate into the contact interface and cause a short circuit, which greatly improves the safety in use.

While the present invention has been described in connection with what is considered the most practical and preferred embodiments, it is understood that this invention is not limited to the disclosed embodiments but is intended to cover various arrangements made without departing from the scope of the broadest interpretation of the appended claims.

What is claimed is:

1. An electrical connector assembly, comprising:

a socket connector cable assembly, comprising:

- a receptacle external mold, having a guiding portion and an engaged portion, wherein the guiding portion is disposed adjacent to the engaged portion;
- a receptacle internal mold disposed in the receptacle external mold;
- a socket connector, assembled with the receptacle external mold and provided with a circuit board and a compressing surface, wherein the compressing surface is disposed on the receptacle internal mold; and
- a cable, connected to the circuit board; and a plug connector cable assembly, comprising:

a plug external mold;

a plug connector, provided with a plug circuit board and assembled with the plug external mold;

a pad, disposed at and connected to a front edge and a side edge of the plug connector cable assembly, wherein the pad comprises a first part and a second part, the first part is disposed on the side edge of the plug connector cable assembly, and the second part is disposed on the front edge of the plug connector cable assembly; and a plug cable, connected to the plug circuit board;

wherein, when the socket connector cable assembly is connected to the plug connector cable assembly, the circuit board of the socket connector cable assembly is connected to the plug circuit board the of the plug connector cable assembly, the first part of the pad abuts against the guiding portion away from the receptacle internal mold, and the second part of the pad abuts on the compressing surface of the receptacle internal mold.

2. The electrical connector assembly as claimed in claim 1, wherein a width of the engaged portion is less than a width of the guiding portion.

3. The electrical connector assembly as claimed in claim 1, wherein a length of the guiding portion is greater than a docking depth of the socket connector cable assembly.

4. The electrical connector assembly as claimed in claim 1, wherein the compressing surface is recessed from a front edge of the receptacle internal mold.

5. An electrical connector assembly, comprising:

a socket connector cable assembly, comprising:

a receptacle external mold;

a receptacle internal mold disposed in the receptacle external mold;

a receptacle front housing, having a guiding portion and an engaged portion, wherein the guiding portion is disposed adjacent to the engaged portion and has a buckling portion;

a socket connector, provided with a circuit board and a compressing surface, wherein the compressing surface is disposed on the receptacle internal mold; and a cable, connected to the circuit board; and a plug connector cable assembly, comprising:

a plug external mold;

a plug connector, provided with a plug circuit board protruding and assembled with the plug external mold;

a pad, disposed at and connected to a front edge and a side edge of the plug connector cable assembly, wherein the pad comprises a first part and a second part, the first part is disposed on the side edge of the plug connector cable assembly, and the second part is disposed on the front edge of the plug connector cable assembly; and a plug cable, connected to the plug circuit board;

wherein, when the socket connector cable assembly is connected to the plug connector, the circuit board of the socket connector cable assembly is connected to the plug circuit board the of the plug connector cable assembly, the first part of the pad abuts against the guiding portion away from the receptacle internal mold, and the second part of the pad abuts on the compressing surface of the receptacle internal mold.

6. The electrical connector assembly as claimed in claim 5, wherein a width of the engaged portion is less than a width of the guiding portion.

7. The electrical connector assembly as claimed in claim 5, wherein a length of the guiding portion is greater than a docking depth of the socket connector cable assembly.

8. The electrical connector assembly as claimed in claim 5, wherein the compressing surface is recessed from a front edge of the receptacle internal mold.

9. The electrical connector assembly as claimed in claim 5, wherein the receptacle internal mold has a fixed portion that is assembled with the buckling portion of the receptacle front housing.

* * * * *